United States Patent
Morrow, Sr.

(10) Patent No.: US 6,498,938 B1
(45) Date of Patent: Dec. 24, 2002

(54) WIRELESS TELEPHONE-TO-WIRED TELEPHONE SYSTEM INTERFACING

(75) Inventor: James G. Morrow, Sr., 3511 Wildwood Dr., Manitowoc, WI (US) 54220

(73) Assignee: James G. Morrow, Sr., Manitowoc, WI (US)

( * ) Notice: Subject to any disclaimer, the term of this patent is extended or adjusted under 35 U.S.C. 154(b) by 0 days.

(21) Appl. No.: 09/460,164

(22) Filed: Dec. 13, 1999

(51) Int. Cl.[7] .................................................. H04Q 7/24

(52) U.S. Cl. ..................... 455/557; 455/556; 455/575

(58) Field of Search ............................... 455/74.1, 426, 455/462, 403, 550, 553, 557, 346, 289

(56) References Cited

U.S. PATENT DOCUMENTS

| | | | | | |
|---|---|---|---|---|---|
| 4,922,517 A | * | 5/1990 | West et al. | .................. | 526/209 |
| 5,771,465 A | * | 6/1998 | Bojeryd | ....................... | 455/426 |
| 5,946,616 A | * | 8/1999 | Schornack et al. | ......... | 455/422 |
| 5,983,117 A | * | 11/1999 | Sandler et al. | .............. | 455/445 |

* cited by examiner

*Primary Examiner*—Thanh Cong Le
*Assistant Examiner*—Tsuleun R Lei

(57) ABSTRACT

A system for using a personal wireless communications unit or circuit with a wired telephone system is disclosed herein. In one embodiment, the system permits the user to provide telephone communication on a wired telephone system at a home using signal transmissions provided by a cellular phone instead of the conventional telephone lines. The system includes an interface which facilitates connection of the cellular phone to the system.

25 Claims, 4 Drawing Sheets

WIRELESS TELEPHONE-TO-WIRED TELEPHONE SYSTEM INTERFACING

FIELD OF THE INVENTION

The present invention relates to telephony. In particular, the present invention relates to interfacing a wireless (e.g. cellular) telephone or communications unit with a wired telephone network.

BACKGROUND OF THE INVENTION

Cellular phones have achieved widespread use, and have become as important to communication as hard-wired phones (e.g. ISDN, cable transmission etc.). However, due to issues such as security, it is difficult to obtain multiple cellular phones having the same phone number. Additionally, a user's hard-wired phone will have a different phone number than that user's cellular phone.

In addition to the issue of uncommon phone numbers, telephones are used for many purposes other than live conversation. For example, digital and analog messages and information are transmitted and stored in analog or digital form in devices such as answering machines, fax machines and computers. Furthermore, telephone communication devices are used at numerous locations such as cars, boats, airplanes, homes (first and second), offices, etc. Depending upon the location and purpose, the telephone may be hard-wired or wireless. Hard-wired systems are normally used at stationary sites (e.g. home or office) and are more convenient to interface with (e.g. RJ11 jacks and cables are standard). Additionally, the mobility of a cellular phone is not as important at a stationary site.

In view of the fact that many users would like a single phone number, and the fact that it is difficult to interface and use a cellular phone with the hard-wired system at a stationary or moveable site (e.g. hands free system in an automobile), it would be desirable to provide a modular system which provides the mobility of a cellular phone and the connectivity of a hard-wired phone system. Additionally, it would be desirable to provide a single cellular communications unit (e.g. card, cartridge, pager) with limited functionality which interfaces with systems which require a wireless communications link (e.g. portable computer, portable phone handset, hard-wired phone system, hands-free system in an automobile, etc.).

SUMMARY OF THE INVENTION

One embodiment of the present invention provides an integrated communication system including a wireless communications unit (WCU) having a first coupler, and a hard-wired telephone system. The telephone system includes a microphone, a speaker, a numeric keypad engageable and disengageable with the first coupler to permit the transmission of signals between the WCU and the hard-wired telephone system, and permit removal and use of the WCU for communications system also includes a power source coupled to the first coupler when separate from the hard-wired telephone system.

Another embodiment of the present invention provides hybrid telephone system including a telephone network in a building coupled to a telephone service and including at least one phone jack, a telephone including a conductor coupled to the phone jack, and an interface unit coupled to the phone jack. The interface unit includes a first coupler. The system also includes a cellular phone including a second coupler engageable and disengageable with the first coupler to permit use of the cellular phone independent of the interface unit when the connectors are disengaged and permit the transfer of information between the cellular phone and the interface unit when the connectors are engaged.

Another embodiment of the present invention also provides an integrated telephone system for a building. The system includes a telephone coupled by a communications cable to a first telephone jack coupled to a telephone network in the building, and a cellular phone including a telephone jack interface configured to transmit signals to a second phone jack coupled to the network. The signals cause the telephone to ring when the cellular phone receives an incoming call and the signals including information representative of a human voice to be heard at the telephone.

DETAILED DESCRIPTION OF THE PREFERRED EMBODIMENTS

Figure 1:
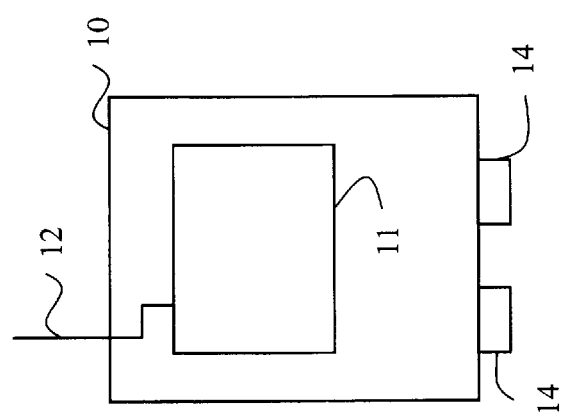
FIG. 1 illustrates a wireless communications unit (WCU)

The following is a detailed description of a preferred embodiment and best mode of my inventive system which provides a range of uses for a wireless/cellular communications unit. Referring to FIG. 1, an exemplary embodiment of my inventive system includes a wireless (e.g. radio, cellular etc.) communications unit (WCU). Depending upon the application, a first embodiment of the WCU takes the form of a wireless communications circuit (WCC) in the form of an integrated circuit and/or circuit board (e.g. PCMCIA card) 10 having a limited range of functionality. WCU 10 includes a wireless communications circuit 11 which produces signals representative of voice and/or data from electromagnetic signals received from an antenna 12 coupled to the WCU. The WCU also has the ability to generate signals applied to antenna 12 for transmission. The WCU includes one or more connectors 14 which provide an interface for powering and/or charging, and communicating information signals representative of data for video and/or audio information to and from the WCC 10.

Figure 2:
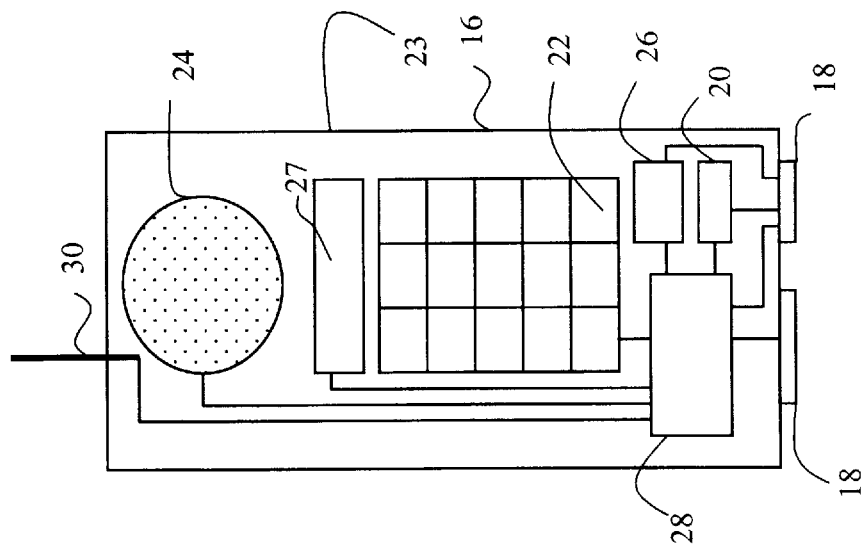
FIG. 2 illustrates a cellular telephone including interface connectors.

A second embodiment of the WCU shown in FIG. 2, takes the form of a cellular telephone or personal two-way radio (digital or analog) 16. The cellular telephone 16 also includes one or more connectors 18 for powering and/or charging telephone 16 and communicating information signals representative of data for video and/or audio information to and from telephone 16. Unlike WCU 10, telephone 16 would be operable as a standard cellular telephone of the type typically including a microphone 20, a numeric keypad 22, a housing 23, a speaker 24, a rechargeable battery 26, display 27 and the telephone circuiting 28 which permits the components of telephone 16 to interact properly and transmit and receive signals via antenna 30.

The overall system also includes a hard-wired telephone system (HWTS). Depending upon the configuration of the WCU and the system requirements, one or more embodiment and combinations of the HWTS may be used. The following is a description of various exemplary embodiments of HWTSs.

Figure 3:
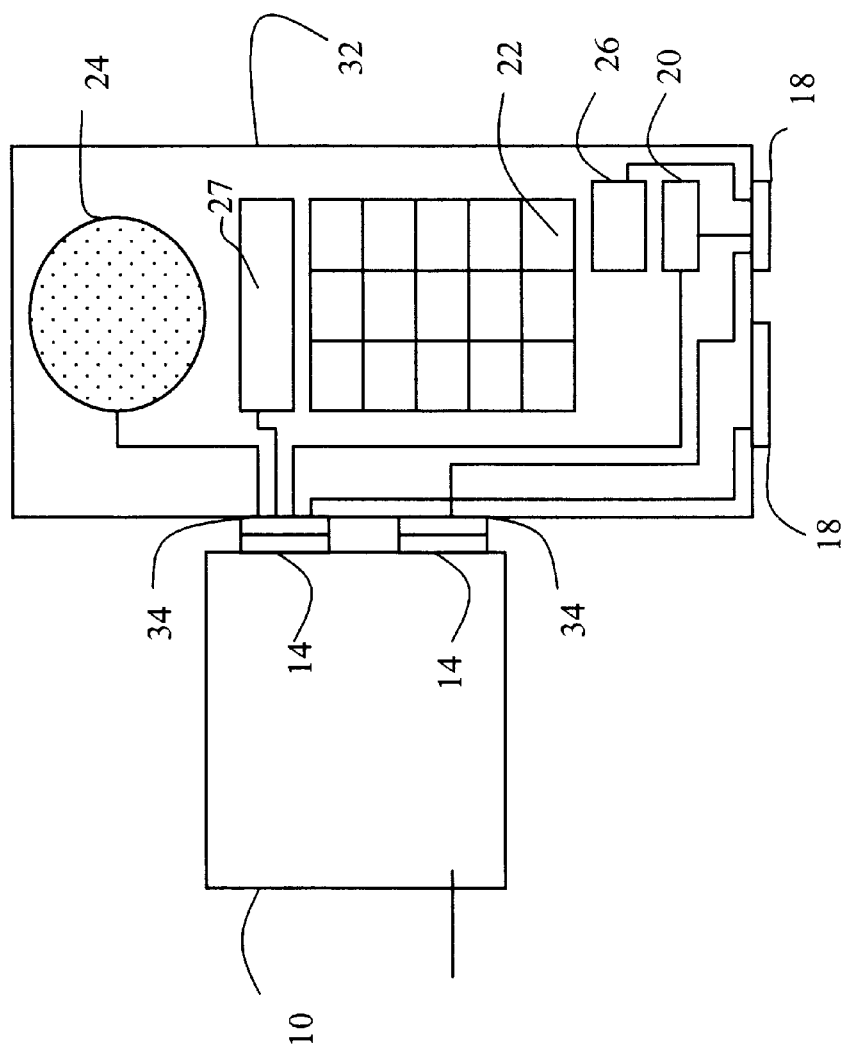
FIG. 3 illustrates a telephone hand set with a removable wireless communications unit.

The first embodiment of a HWTS is intended for use with a WCU in the form of WCC 10. Referring to FIG. 3, a telephone unit 32 is shown. Unit 32 has many of the same components as telephone 16. However, unit 32 does not include circuit 28 or antenna 30. Rather, unit 32 includes connector(s) 34 compatible with connectors 14. (Please note that the coupling accomplished by connectors 34 and 14 could be with an optical connection or other non-contact type of low-power signal connection.) With this configuration, the combination of WCC 10 when connected to (plugged into) unit 32 provides an operable cellular phone. When circuit 10 is configured to include the data memory 10 for storing phone numbers and other personal data, the user of WCC 10 can use WCC 10 with a range of HWTS and retain numbers and personal data from HWTS to HWTS. Additionally, the cellular phone number for the user remains the same.

Figure 4:
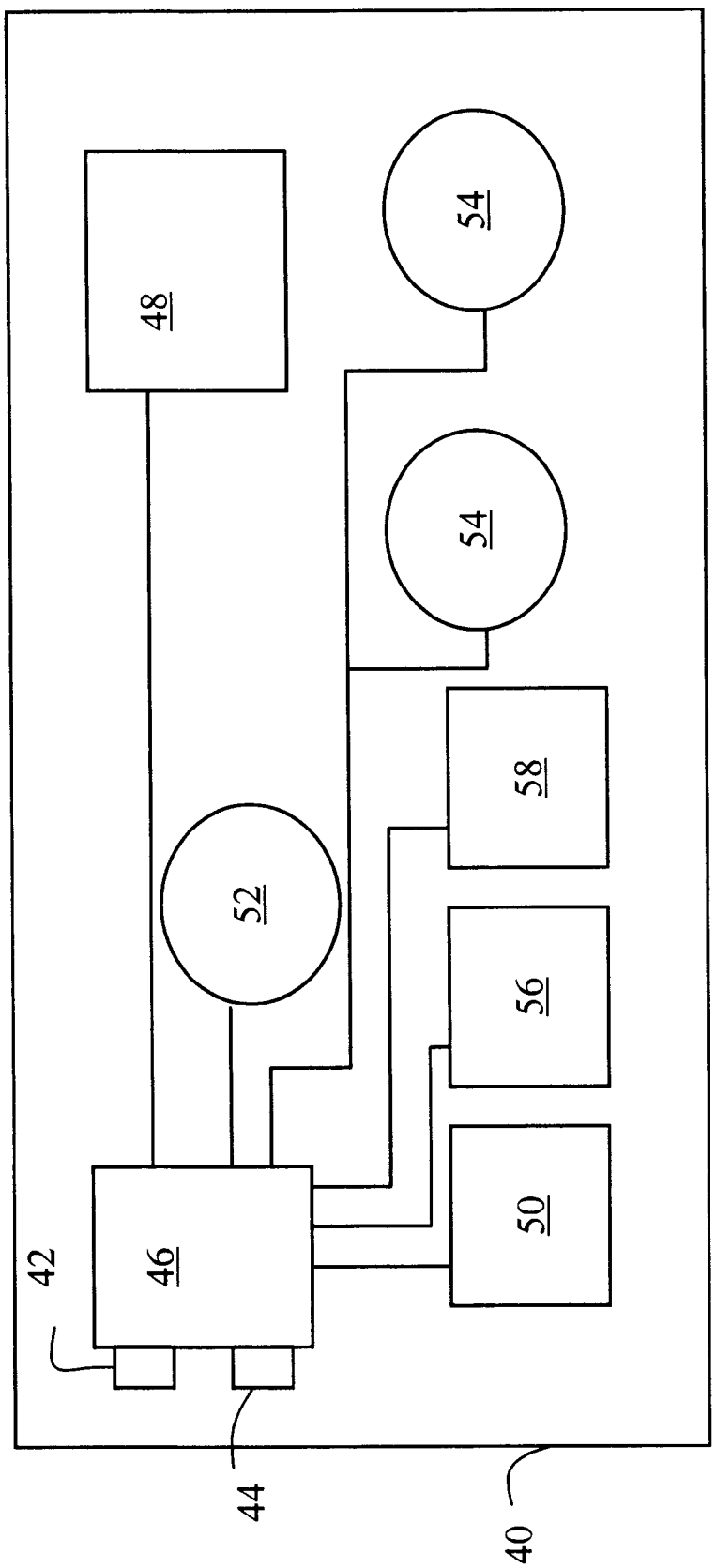
FIG. 4 is a block diagram of a hands free phone system which uses either a CCU or cellular phone for cellular communications.

Another embodiment of an HWTS can be used with WCUs having a range of forms including a WCC 10, cellular phone 16 or an alternative WCU such as a pager. This embodiment of an HWTS is shown in FIG. 4 in the form of an interface 46, microphone 52, speakers 54, and associated wiring and/or signal connector 42 combined to provide a hands-free type system in a vehicle such as a boat or motor vehicle (e.g. car, bus, van, etc.) schematically represented by referenced boundary 40. In vehicles, interface 46 could be integrated with the car radio. In some vehicles, the radio operates as a part of the circuitry for hands-free phones.

Referring to FIG. 4, the interface 46 includes a signal connector 42 and, depending upon the application and need for powering or charging the associated WCC or WCU, a power connector 44 which may be separate or integral with connector 42. Connectors 42 and 44 are coupled to an interface unit 46 which can be connected to the vehicle battery 48 and provide the appropriate power connection circuitry to provide the appropriate power (e.g. 5V, 9V, 12V, etc.) to connector 44.

Interface 46 may also be connected to a control panel 50 (e.g. keypad), a microphone 52, one or more speakers 54 and a display 56. Interface 46 includes circuitry to convert data or voice information signals applied to connector 42 to generate audio sounds (i.e. voice, music, etc.) on speakers 54 or generate alphanumeric data or graphics on display 56. Interface 46 also converts data from the control panel 50 into signals for controlling volume on speakers 54 or for generating signals at connector 42 applied to the associated WCC. Interface 46 also applies signals representative of sounds at microphone 52 to connector 42.

In one embodiment, HWTS OF FIG. 4 may also include a camera 58 connected to interface 46. In this configuration, the interface generates signals representative of images viewed by camera 58 and applied to connector 42. Aside from the HTWS system of FIG. 4, one use of the present invention is a road side speed monitoring system which includes a speed sensing system (e.g. radar). In such a system, a vehicle's speed is monitored, a speed signal is generated, and the camera generates image data representations of the car and/or license plate. Interface 46, in cooperation with a WCC or WCU, transmits signals representative of the speed and image to the appropriate authority.

Referring again to the HTWS of FIG. 4, and by way of example only, this HTWS system may be used with a WCU such as cellular telephone 16. In this configuration, connectors 18 are engaged with connectors 42 and 44 of the HTWS. Interface 46 and telephone 16 cooperate to send and receive signals received and generated at antenna 30. These signals are representative of the audio, video, graphic and/or control panel signals applied to or generated by the HTWS.

Figure 5:
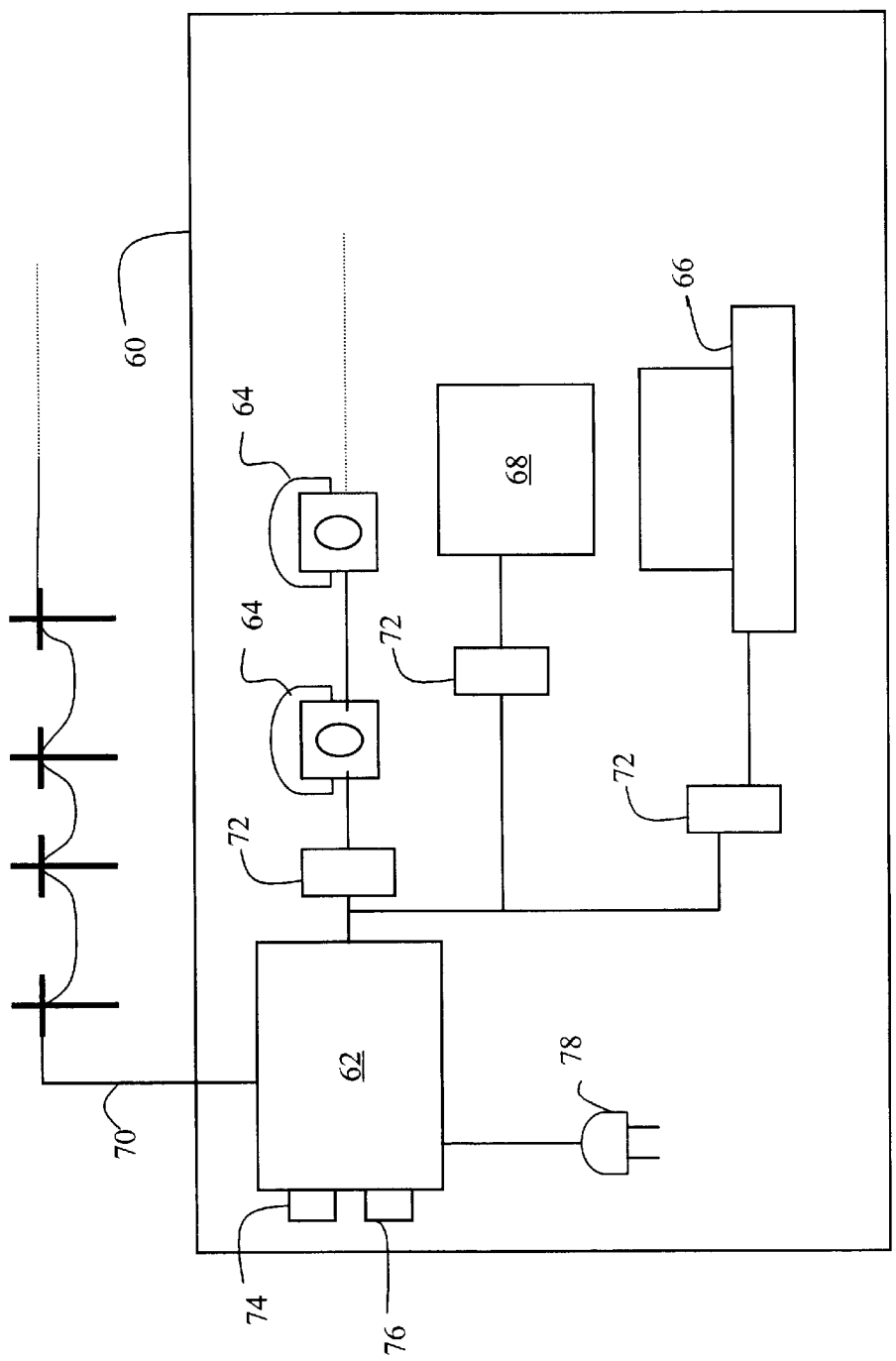
FIG. 5 illustrates a hard-wired telephone system which may be used at a stationary site such as a home or office, and illustrates an embodiment of a wireless interface.

Another embodiment of an HTWS is the hard-wired, conventional telephone system in a building schematically represented by boundary 60. FIG. 5 illustrates such an HTWS which may include an interface 62, one or more telephones (cordless or wired handset) 64, a computer 66 and an answering machine 68. Interface 62 is coupled to the wired telephone system 70 and couples system 70 to telephone RJ-11 jacks 72.

Interface 62 includes a signal connector 74 and, depending upon the application and need for powering or charging the associated WCC or WCU, a power connector 76 which may be separate or integral with connector 74. Interface 62 may be connected to building power with plug 78 for a source of electrical power.

In operation if a WCC or WCU is not connected to interface 62, the HTWS operates in a conventional manner with telephone information and/or data passing through interface 62. However, if a WCC or WCU is connected to interface 62 at connectors 74 and/or 76, interface 62 does not permit signal transmissions to or from telephone line 70. Rather, interface 62 includes circuitry to ring phones 64 in response to an incoming call on the associated WCC or WCU, to control the WCC or WCU to answer the call when a phone 64 is picked up or machine 68 or PC 64 answers.

The circuitry of interface 62 is also configured to control the WCC or WCU to initial and outgoing call when a call is attempted to be placed in a conventional manner using a telephone 64 or PC.64.

Once given this description of the preferred embodiments and the appended claims to the invention attached hereto, those skilled in the art will be able to provide the specific configurations (circuiting, programming, etc.) required to set up a system which meets the needs of a particular application. Because the invention can be used for a broad range of applications, it is not believed that engineering details for a particular application would be particularly useful. Furthermore, given that a patent for this application will not issue for a substantial time after the filing of this application, detailed circuitry, software and component descriptions may not be particularly useful by the time this application issues as a patent.

Given the speed at which semiconductor, electronics and software technology is progressing, the preceding is a description of the preferred embodiment of my inventive system which I contemplate will be implemented with the most technical and cost effective technology available at the time it is used for a particular application.

While a number of embodiments of my invention and modifications thereto are disclosed herein, it should be understood that my invention should be viewed as covering the communication of a broad range of information using digital and/or analog transmission. Examples of such information include voice, computer data, internet data, video data, internet voice, music data, graphics data, etc. Within the limitations placed on defining an invention with words, I have attempted to clearly define my invention with the following claims. Accordingly, these claims should be read to be given their broadest interpretation in view of the prior art.

In addition, my invention can be used for uses in addition to those specified herein. For example, my invention could be used to provide additional phone lines in a building without adding wired lines to the building.

What is claimed is:

1. An integrated communication system for providing a wireless communication function to at least two different types of telephone systems comprising:

a wireless communications unit (WCU) including a first coupler;

a hard-wired telephone system, including a first microphone, a first speaker, a first numeric keypad and a second coupler engageable and disengageable the first coupler to permit the transmission of signals between the WCU and the hard-wired telephone system, and permit removal and use of the WCU when separate from the hard-wired telephone system;

a mobile telephone system, including a second microphone, a second speaker, a second numeric keypad and a third coupler engageable and disengageable with the first coupler to permit the transmission of signals between the WCU and the mobile telephone system, and permit removal and use of the WCU when separate from the mobile telephone system; and a power source coupled to the first coupler.

2. The system of claim 1, wherein the WCU is a cellular phone, and the hard-wired telephone system includes at least one telephone coupled to a telephone jack located at a building.

3. The system of claim 2 wherein the hard-wired telephone system further comprising an interface unit for coupling the cellular phone to the telephone jack, the interface unit being configured to permit the telephone to ring in response to an incoming call on the cellular phone, and communicate information received by the cellular phone to the telephone when the telephone is picked up.

4. The system of claim 3, further comprising a telephone answering machine coupled to the interface units.

5. The system of claim 4, wherein the telephone answering machine is integral with the telephone.

6. The system of claim 5, wherein the telephone jack is coupled to a non-cellular telephone system.

7. The system of claim 6, wherein the interface unit is configured to allow information from the non-cellular phone system to be communicated to the telephone.

8. The system of claim 3, wherein the telephone jack is coupled to a non-cellular telephone system, and the interface unit is coupled to an information storage system to permit information communicated from the cellular phone or the non-cellular telephone system to be stored on the information storage system when the other of the cellular phone is also communicating information.

9. The system of claim 8 wherein the information is representative of human voice.

10. The system of claim 1, wherein the hard-wired telephone system includes at least one telephone coupled to a telephone jack located at a building, the telephone jack is coupled to a non-cellular telephone system, and the hard-wired telephone system includes an interface unit which includes the second connector.

11. The system of claim 10, further comprising an answering machine coupled to the telephone jack.

12. The system of claim 11, wherein the telephone is a cordless telephone.

13. A hybrid telephone system comprising:

a telephone network in a building coupled to a telephone service and including at least one phone jack;

a telephone including a conductor coupled to the phone jack;

an interface unit coupled to the phone jack, the interface unit including a first coupler; and a cellular phone including a second coupler engageable and disengageable with the first coupler to permit use of the cellular phone independent of the interface unit when the connectors are disengaged and permit the transfer of information between the cellular phone and the interface unit while not permitting the transfer of information between the telephone network in the building and the telephone service when the connectors are engaged.

14. The system of claim 13 further comprising an answering machine coupled to the telephone jack.

15. The system of claim 13 wherein the answering machine is integrated with the telephone.

16. The system of claim 13 wherein the telephone includes a cordless jack.

17. The system of claim 13 wherein the information is representative of human voice.

18. The system of claim 13 wherein the information is conveyed by digital data signals.

19. The system of claim 13 wherein the interface unit includes an electric power part which is connected to the cellular phone when the connectors are engaged.

20. The system of claim 13, further comprising a computer coupled to the telephone jack, the computer being programmed to communicate information to and from the internet.

21. The system of claim 20, wherein the computer is programmed to receive information related to products or services.

22. The system of claim 21, wherein the products include automobiles, foods, appliances, furniture, electronics, products or property.

23. The system of claim 21, wherein the services include real estate, financial repair, software updates, product ordering, accounting or banking services.

24. A cellular phone comprising a telephone jack interface configured to transmit signals from the cellular phone to an RJ11 connector for communication to a hard-wired phone system and for disconnecting communication between the hard-wired phone system and a telephone line.

25. An integrated telephone system for a building comprising:

a telephone coupled by a communications cable to a first telephone jack coupled to a telephone network in the building; and a cellular phone including a telephone jack interface configured to transmit first signals to a second phone jack coupled to the network and configured to not allow transmission of second signals between the telephone network and a telephone line, the first signals causing the telephone to ring when the cellular phone receives an incoming call and the first signals including information representative of a human voice to be heard at the telephone.

* * * * *